US012597701B2

(12) United States Patent
Bunga et al.

(10) Patent No.: US 12,597,701 B2
(45) Date of Patent: Apr. 7, 2026

(54) BASE STATION ANTENNAS HAVING F-STYLE ARRAYS THAT GENERATE ANTENNA BEAMS HAVING NARROWED AZIMUTH BEAMWIDTHS

(71) Applicant: Outdoor Wireless Networks LLC, Claremont, NC (US)

(72) Inventors: Sekharbabu Bunga, Sullurpeta (IN); Kumara Swamy Kasani, GodavariKahani (IN); Ligang Wu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 125 days.

(21) Appl. No.: 18/499,562

(22) Filed: Nov. 1, 2023

(65) Prior Publication Data

US 2024/0162599 A1 May 16, 2024

(30) Foreign Application Priority Data

Nov. 11, 2022 (IN) ............................. 202221064701

(51) Int. Cl.
*H01Q 21/26* (2006.01)
*H01Q 1/24* (2006.01)
*H01Q 21/06* (2006.01)

(52) U.S. Cl.
CPC ........... *H01Q 1/246* (2013.01); *H01Q 21/062* (2013.01)

(58) Field of Classification Search
CPC ...... H01Q 1/246; H01Q 21/062; H01Q 21/08; H01Q 21/26
See application file for complete search history.

(56) References Cited

U.S. PATENT DOCUMENTS

| | | | | |
|---|---|---|---|---|
| 8,416,142 | B2 | 4/2013 | Goettl | |
| 2020/0373668 | A1* | 11/2020 | Wu | H01Q 9/285 |
| 2023/0006367 | A1 | 1/2023 | Varnoosfaderani et al. | |
| 2023/0093260 | A1* | 3/2023 | Xiao | H01Q 1/48 343/725 |

* cited by examiner

*Primary Examiner* — David E Lotter
(74) *Attorney, Agent, or Firm* — Myers Bigel, P.A.

(57) ABSTRACT

Base station antennas include first and second RF ports, a first array of radiating elements that includes a first column of radiating elements, a first additional radiating element and a second additional radiating element, where each of the radiating elements in the first array of radiating elements are coupled to the first RF port and not to the second RF port, and a second array of radiating elements that includes a second column of radiating elements, a third additional radiating element and a fourth additional radiating element, where each of the radiating elements in the second array of radiating elements are coupled to the second RF port and not to the first RF port. The first through fourth additional radiating elements may form a third column of radiating elements that is positioned between the first column of radiating elements and the second column of radiating elements.

18 Claims, 7 Drawing Sheets

BASE STATION ANTENNAS HAVING F-STYLE ARRAYS THAT GENERATE ANTENNA BEAMS HAVING NARROWED AZIMUTH BEAMWIDTHS

CROSS-REFERENCE TO RELATED APPLICATION

The present application claims priority to Indian Provisional Patent Application No. 202221064701, filed Nov. 11, 2022, the entire content of which is incorporated herein by reference.

FIELD

The present invention generally relates to radio communications and, more particularly, to base station antennas utilized in cellular and other communications systems.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. Most cells are divided into a plurality of "sectors," and separate base station antennas provide coverage to each of the sectors. The base station antennas are often mounted on a tower or other raised structure, with the radiation pattern ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is generally perpendicular relative to the plane defined by the horizon. References will also be made herein to the "azimuth" and "elevation" planes. The azimuth plane refers to a horizontal plane that bisects the base station antenna that is parallel to the plane defined by the horizon. The elevation plane refers to a plane that is perpendicular to the azimuth plane that bisects the front surface of the base station antenna.

A common base station configuration is a "three sector" configuration in which a cell is divided into three 120° sectors in the azimuth plane, and the base station includes three base station antennas that provide coverage to the three respective sectors. In a three sector configuration, the antenna beams generated by each base station antenna typically have a Half Power Beam Width ("HPBW") in the azimuth plane of about 65°, as such an antenna beam may provide good coverage throughout a 120° sector without having significant RF energy spill over into the other two sectors. Herein, a HPBW of an antenna beam in the azimuth plane may be referred to as the "azimuth HPBW" and the HPBW of an antenna beam in the elevation plane may be referred to as the "elevation HPBW." Unless noted otherwise, references to a HPBW of an antenna beam refer to the HPBW at the center frequency of the operating frequency band of the array of radiating elements that form the antenna beam.

Each individual radiating element in the above-discussed arrays will typically be designed to generate an individual antenna beam (i.e., the antenna beam that is generated if an RF signal is only transmitted through a single radiating element of the array, which is also referred to herein as an "element pattern") having a HPBW of about 65° in both the azimuth and elevation planes. The azimuth HPBW of an antenna beam generated by an array of radiating elements is a function of (among other things) the azimuth HPBW of the element pattern of the radiating elements (note that typically the radiating elements in an array are identical and hence all have the same element pattern) and the distance between the leftmost and rightmost radiating elements in the array (referred to as the "aperture" of the array in the azimuth plane). As noted above, for a three-sector base station, it is typically desired that the antenna beams generated by an array of radiating elements have an azimuth HPBW of about 65°. Since most radiating elements are designed to have an azimuth HPBW of about 65°, a single radiating element, or a vertically-extending column of radiating elements, will generate antenna beams having the desired 65° azimuth HPBW.

The elevation HPBW of an antenna beam generated by an array of radiating elements is a function of the elevation HPBW of the element pattern of the radiating elements and the distance between the topmost and bottommost radiating elements in the array (i.e., the aperture of the array in the elevation plane). In most applications, cellular operators desire antenna beams having an elevation HPBW that is much smaller than 65°, such as elevation HPBWs of 10°-30°. To narrow the beamwidth in the elevation plane, a column of radiating elements are used so that the aperture of the array in the elevation plane is increased. Such columns of radiating elements are often referred to as "linear arrays." An RF signal that is to be transmitted by such a linear array is split into a plurality of sub-components that are fed to the respective individual radiating elements in the linear array. The vertical spacing between the radiating elements in the linear array is typically kept below about 0.9*λ, where λ is the wavelength corresponding to the center frequency of the operating frequency band. Keeping the vertical spacing below 0.9*λ helps suppress grating lobe formation, which are undesired sidelobes having peak radiation outside of the azimuth and elevation planes. The more radiating elements that are added to the column (thereby increasing the distance between the topmost and bottommost radiating elements) the narrower the resulting elevation HPBW. Each linear array generates an antenna beam or, if the linear array is formed using dual-polarized radiating elements, forms an antenna beam at each of two orthogonal polarizations.

Cellular communications are primarily performed in three different frequency ranges, which are commonly referred to as the "low-band," "mid-band" and "high-band" frequency ranges. The low-band frequency range is generally defined as the 696-960 MHz (or more recently as the 617-960 MHz frequency range). The mid-band frequency range is generally defined as the 1695-2690 MHz (or, more recently as the 1427-2690 MHz frequency range). The high-band frequency range is more variable in nature, but may include different ranges of frequencies in the 3.1-5.8 GHz frequency range. Cellular operators are licensed to use small sub-bands in each of these frequency ranges, where the sub-bands will vary with geographic location and operator. Consequently, particularly for the low-band and mid-band frequency ranges, base station antennas typically include linear arrays that support service across the full low-band and mid-band frequency ranges so that the antennas can be used by any operator in any geographic location.

There is significant interest in base station antennas that include two linear arrays of radiating elements that support service in the same frequency band, as two linear arrays of dual-polarized radiating elements can support 4×multi-input-multi-output ("4×MIMO") communications. MIMO refers to a communication technique where a baseband data stream is sub-divided into multiple sub-streams that are used to generate multiple RF signals that are transmitted through multiple different arrays of radiating elements. The different arrays are, for example, spatially separated from one another and/or at orthogonal polarizations so that the transmitted RF signals will be sufficiently decorrelated. The multiple RF signals are recovered at the receiver and demodulated and decoded to recover the original data sub-streams, which are then recombined. The use of MIMO transmission techniques may help overcome the negative effects of multipath fading, and may be particularly effective in urban environments where reflections may increase the level of decorrelation between the RF signals. Typically, cellular operators desire antennas that support at least 4×MIMO communications, meaning that the base station antenna must generate four decorrelated antenna beams, which requires two arrays of dual-polarized radiating elements.

Unfortunately, it can be challenging to implement base station antennas that support 4×MIMO in the low-band frequency range in a commercially acceptable manner. The size of a radiating element is inversely correlated with its frequency of operation, and hence the low-band radiating elements are usually the largest radiating elements in a base station antenna, typically having a width that exceeds 200 mm. As such, providing an antenna that includes two arrays of low-band radiating elements usually results in an antenna having a width exceeding 600 mm, which is undesirable.

For example, FIG. 1 is a schematic front view of a conventional base station antenna 1 (with the radome thereof removed) that illustrates the difficulty of providing a narrow width base station antenna that includes two linear arrays of low-band radiating elements.

As shown in FIG. 1, base station antenna 1 includes first and second arrays 20-1, 20-2 of dual-polarized low-band radiating elements 24. Herein, when multiple of the same elements are included in an antenna, the elements may be referred to individually by their full reference numeral (e.g., array 20-2) and collectively by the first part of their reference numerals (e.g., the arrays 20). Each low-band array 20-1, 20-2 is implemented as a vertically-extending column 22-1, 22-2 or "linear array" of radiating elements. In FIG. 1, the reference numerals 20-1/22-1 and 20-2/22-2 are used as each column 22 of radiating elements 24 is also a linear array 20 of radiating elements 24. Typically, the base station antenna 1 will also include two or four linear arrays of mid-band radiating elements as the mid-band radiating elements are smaller and can be mounted behind the low-band radiating elements 24 without increasing the width of the base station antenna 1. Base station antenna 1 is depicted as including two such linear arrays 50-1, 50-2 of mid-band radiating elements 54. To simplify the figures, the base station antennas according to embodiments of the present invention that are disclosed herein are shown as each only including a pair of arrays of low-band radiating elements. It will be appreciated however, that additional arrays of radiating elements may be included in these antennas such as, for example, two or four linear arrays of mid-band radiating elements.

As shown in FIG. 1, the low-band radiating elements 24 are mounted to extend forwardly from a reflector 10. The radiating elements 24 are schematically shown as being implemented as slant −45°/+45° radiating elements that each include a first dipole radiator 28-1 that transmits and receives RF radiation having a −45° linear polarization and a second dipole radiator 28-2 that transmits and receives RF radiation having a +45° linear polarization. The first dipole radiator 28-1 of each low-band radiating element 24 in the first linear array 20-1 is coupled to a first low-band RF port 30-1 through a first feed network (not shown), and the second dipole radiator 24-2 of each low-band radiating element 24 in the first linear array 20-1 is coupled to a second low-band RF port 30-2 through a second feed network (not shown). Thus, RF signals input at RF port 30-1 are transmitted by the first dipole radiators 28-1 of the radiating elements 24 of the first low-band array 20-1 to generate a first low-band antenna beam (having a +45° polarization), and RF signals input at RF port 30-2 are transmitted through the second dipole radiators 28-2 of the radiating elements 24 of the first low-band array 20-1 to generate a second low-band antenna beam (having a −45° polarization). The second low-band array 20-2 is coupled to the third and fourth low-band RF ports 30-3, 30-4 in the same manner and hence can generate third and fourth low-band antenna beams. The first and second mid-band linear arrays 50-1, 50-2 are coupled to mid-band RF ports 32-1 through 32-4 in the same manner to generate four mid-band antenna beams.

Base station antennas having the design of base station antenna 1 of FIG. 1 will typically have a width that exceeds 600 mm. Antennas having such large widths are heavy, have very high wind loading, and may exceed local ordinances governing the permissible sizes for base station antennas. While the width of the antenna could be reduced by decreasing the lateral spacing between the linear arrays 20-1, 20-2 of low-band radiating elements 24, spacing the low-band linear arrays 20-1, 20-2 closer together acts to increase the degree of signal coupling between the linear arrays 20-1, 20-2 and this "parasitic" coupling can itself lead to an undesired increase in HPBW. Moreover, in many cases the size of each low-band radiating element 24 is reduced as much as possible to decrease the width of the base station antenna, but the smaller low-band radiating elements 24 have larger azimuth HPBWs and thus the generated antenna beams will tend to have reduced gain and/or spill over into neighboring sectors. Consequently, it may be difficult to provide commercially acceptable base station antennas that support 4×MIMO communications in the low-band frequency range.

A further challenge is that in some jurisdictions the low-band frequency range has been extended to encompass the 617-960 MHz frequency band. Since the size of a radiating element and its resonant frequency are inversely related, low-band radiating elements 24 that operate over the full 617-960 MHz frequency band are even larger than more conventional low-band radiating elements, which results in a corresponding increase in the width of the base station antennas that include two arrays of such radiating elements.

Several different solutions have been proposed for providing based station antennas that support 4×MIMO communications in the low-band frequency range while having reduced widths. For example, base station antennas have been previously suggested that include antenna arrays that comprise a vertically-extending column of radiating elements plus an additional radiating element that is horizontally offset from the main column of radiating elements. The additional radiating element acts to narrow the azimuth beamwidth of the array, thereby allowing smaller radiating elements to be used while still achieving, for example, a 65° azimuth HPBW. FIGS. 2A-2C are schematic views of three base station antennas that each include two arrays of low-band radiating elements where each array includes a vertically-extending column of low-band radiating elements plus an additional horizontally offset low-band radiating element.

Referring first to FIG. 2A, a conventional base station antenna 1A is depicted that includes first and second arrays 20A-1, 20A-2 of low-band radiating elements. Low-band array 20A-1 comprises a first column 22-1 of low-band radiating elements 24 plus a first additional radiating element 26-1 that is horizontally offset from the first column 22-1 of low-band radiating elements 24. Similarly, low-band array 20A-2 comprises a second column 22-2 of low-band radiating elements 24 plus a second additional radiating element 26-2 that is horizontally offset from the second column 22-2 of low-band radiating elements 24. As discussed above, base station antenna 1A may further include two or more arrays of mid-band radiating elements that are not shown in FIG. 2A to simplify the drawing.

The base station antenna 1A may be identical to the base station antenna 1 of FIG. 1, except that (1) an additional radiating elements is provided in each column 22 and (2) the low-band radiating elements 24 are grouped differently to form the two low-band arrays 20A-1, 20A-2. To help highlight which radiating elements 24 form each array 20A-1, 20A-2, polygons have been drawn around each array 20A. As shown in FIG. 2A, the first low-band array 20A-1 includes the bottom six low-band radiating elements 24 in the left-hand column 22-1 as well as a first additional radiating element 26-1 which is the bottom radiating element in the right-hand column 22-2, while the second array 20A-2 includes the top six radiating elements 24 in the right-hand column 22-2 as well as a second additional radiating element 26-2 which is the top radiating element in the left-hand column 22-1. Thus, the first array 20A-1 has an L-shape and the second array 20A-2 has an upside-down L-shape. Since each array 20A-1, 20A-2 includes an additional radiating element 26 that is in the opposite column 22-2, 22-1, respectively, the horizontal aperture of each array 20A-1, 20A-2 is increased, with a commensurate reduction in the azimuth beamwidth. One disadvantage, however, of this design is that it requires adding an additional radiating element 26 to each column 22-1, 22-2 (to allow one row of each array 20A to include two radiating elements 24, 26), which increases the length and cost of the antenna 1A. Note that the radiating elements of an array that are horizontally offset from the majority of the radiating elements in the array are identified using a different reference numeral (here 26 instead of 24) to highlight the fact that these radiating elements are horizontally offset. It will be appreciated that the radiating elements 24 and 26 may (but need not) have the exact same construction.

FIG. 2B is a schematic front view of a conventional base station antenna 1B that increases the horizontal aperture without the need for adding an extra radiating element in each column. The base station antenna 1B includes two columns 22-1, 22-2 of low-band radiating elements that form first and second so-called "Y-shaped" arrays 20B-1, 20B-2 (note that each array 20B is one radiating element short of having a true "Y-shape"). The base station antenna 1B is similar to the base station antenna 1 of FIG. 1, except that the bottom radiating element 26-1, 26-2 in each column 22-1, 22-2 is switched to be part of the low-band array 20B formed by the rest of the low-band radiating elements 24 in the opposite column 22-1, 22-2. Since each array 20B-1, 20B-2 includes a radiating element 26 that is in the opposite column 22-1, 22-2, the horizontal aperture of each array 20B-1, 20B-2 is increased, with a commensurate reduction in the azimuth beamwidth. Moreover, the base station antenna 1B does not include two radiating elements in any row, and hence does not suffer from the cost and size disadvantages associated with base station antenna 1A. A disadvantage, however, of the design of base station antenna 1B is that the physical distance between the bottom two radiating elements 24,26 in each array 20B-1, 20B-2 is increased (since the physical distance is taken along a diagonal as opposed to simply being the vertical distance between the two radiating elements), and this results in off-axis grating lobes in the radiation patterns formed by the first and second arrays 20B-1, 20B-2. These grating lobes reduce the gain of the antenna 1B, and may also result in interference with neighboring base stations.

FIG. 2C is a schematic front view of another conventional base station antenna 1C that has low-band arrays having increased horizontal apertures. The base station antenna 1C is disclosed in U.S. Pat. No. 8,416,142 to Göttl. As shown in FIG. 2C, the base station antenna 1C includes first and second columns 22-1, 22-2 of cross-dipole low-band radiating elements 24. The radiating elements 24 in the left-hand column 22-1 are part of a first array 20C-1, and the radiating elements 24 in the right-hand column 22-2 are part of a second array 20C-2. The antenna 1C further includes first and second additional radiating elements 26-1, 26-2, which may be centrally located radiating elements 26-1, 26-2. The additional radiating elements 26-1, 26-2 may be identical in design to the radiating elements 24. One dipole radiator 28-1, 28-2 of each centrally-located radiating element 26-1, 26-2 is part of the first array 20C-1 and the other dipole radiator 28-1, 28-2 of each centrally-located radiating element 26-1, 26-2 is part of the second array 20C-2. Thus, the first array 20C-1 includes six dipole radiators for each polarization (namely the five dipole radiators at each polarization included in the radiating elements 24 in the first column 22-1, the +45° dipole radiator 28-1 of centrally-located radiating element 26-1, and the −45° dipole radiator 28-2 of centrally-located radiating element 26-2). Likewise, the second array 20C-2 includes six dipole radiators for each polarization (namely the five dipole radiators at each polarization included in the radiating elements 24 in the second column 22-2, the −45° dipole radiator 28-2 of centrally-located radiating element 26-1, and the +45° dipole radiator 28-1 of centrally-located radiating element 26-2). The centrally-located radiating elements 26-1, 26-2 act to narrow the azimuth beamwidth by increasing the horizontal aperture of each array 20C-1, 20C-2, thereby allowing for reduction in the size of the individual radiating elements 24, 26.

While the above techniques may help narrow the width of a base station antenna, the width of a 4×MIMO antenna that uses the above techniques for low-band arrays that operate in the full 617-960 MHz frequency range are typically on the order of 640 mm, which is generally considered to be too large.

SUMMARY

Pursuant to embodiments of the present invention, base station antennas are provided that include first and second RF ports, a first array of radiating elements that includes a first column of radiating elements, a first additional radiating element and a second additional radiating element, where each of the radiating elements in the first array of radiating elements are coupled to the first RF port and not to the second RF port, and a second array of radiating elements that includes a second column of radiating elements, a third additional radiating element and a fourth additional radiating element, where each of the radiating elements in the second array of radiating elements are coupled to the second RF port and not to the first RF port. The first through fourth additional radiating elements form a third column of radiating elements that is positioned between the first column of radiating elements and the second column of radiating elements.

In some embodiments, the first array of radiating elements and the second array of radiating elements each comprise an F-style array of radiating elements.

In some embodiments, the first additional radiating element is fed 180° out-of-phase with respect to a first radiating element in the first column of radiating elements that is closest to the first additional radiating element. In some embodiments, the first additional radiating element is fed 180° out-of-phase with respect to each radiating element in the first column of radiating elements. In some embodiments, the second additional radiating element is fed 180° out-of-phase with respect to a second radiating element in the first column of radiating elements that is closest to the second additional radiating element.

In some embodiments, a first radiating element in the first column of radiating elements that is closest to the first additional radiating element is positioned at a top end of the first column of radiating elements, and a second radiating element in the first column of radiating elements that is closest to the second additional radiating element is positioned in a central position in the first column of radiating elements. In some embodiments, a third radiating element in the second column of radiating elements that is closest to the third additional radiating element is positioned at a bottom end of the second column of radiating elements, and a fourth radiating element in the second column of radiating elements that is closest to the fourth additional radiating element is positioned in a central position in the second column of radiating elements. In some embodiments, the first additional radiating element is horizontally aligned with the first radiating element in the first column of radiating elements and is also horizontally aligned with a fifth radiating element in the second column of radiating elements that is at a top end of the second column. In some embodiments, the first additional radiating element is vertically offset from the first radiating element in the first column of radiating elements and is also vertically offset from a fifth radiating element in the second column of radiating elements that is at a top end of the second column. In some embodiments, a spacing between the second additional radiating element and the fourth additional radiating element is substantially the same as an average spacing between adjacent radiating elements in the first column of radiating elements.

In some embodiments, some of the radiating elements in the first array of radiating elements each have a first dipole arm that extends at an angle of −45° with respect to a longitudinal axis of the first column of radiating elements and a second dipole arm that extends at an angle of +45° with respect to the longitudinal axis of the first column of radiating elements, and other of the radiating elements in the first array of radiating elements each have a first dipole arm that extends parallel to the longitudinal axis of the first column of radiating elements and a second dipole arm that extends perpendicularly to the longitudinal axis of the first column of radiating elements.

In some embodiments, all of the radiating elements in the first array of radiating elements each have a first dipole arm that extends at an angle of −45° with respect to a longitudinal axis of the first column of radiating elements and a second dipole arm that extends at an angle of +45° with respect to the longitudinal axis of the first column of radiating elements, and wherein the first and second dipole arms of some of the radiating elements in the first array of radiating elements each have a first length, while the first and second dipole arms of other of the radiating elements in the first array of radiating elements each have a second length that is less than the first length by at least 10%.

In some embodiments, the base station antenna further comprises a reflector, and the radiating elements of the first array of radiating elements and the radiating elements of the second array of radiating elements are mounted to extend forwardly from the reflector.

In some embodiments, the first and second additional radiating elements are both positioned on a same side of the third and fourth additional radiating elements. In other embodiments, the second additional radiating element is positioned in between the third additional radiating element and the fourth additional radiating element.

In some embodiments, the radiating elements in the first column of radiating elements are horizontally aligned with respective radiating elements in the second column of radiating elements to define a plurality of rows of radiating elements, and the first additional radiating element overlaps a first of the rows of radiating elements and the second additional radiating element overlaps a second of the rows of radiating elements, and at least one additional of the rows of radiating elements is in between the first and second of the rows of radiating elements.

In some embodiments, at least two of the rows of radiating elements are in between the first and second of the rows of radiating elements.

Pursuant to further embodiments of the present invention, base station antennas are provided that include a reflector, a first RF port, and a first array of radiating elements mounted to extend forwardly from the reflector, where the radiating elements of the first array form a first F-style array of radiating elements, where each of the radiating elements in the first array is coupled to the first RF port.

In some embodiments, the base station antenna further comprises a second RF port and a second array of radiating elements mounted to extend forwardly from the reflector, where the radiating elements of the second array form a second F-style array of radiating elements, where each of the radiating elements in the second array is coupled to the second RF port.

In some embodiments, the first array of radiating elements includes a first column of radiating elements, a first additional radiating element and a second additional radiating element, the second array of radiating elements includes a second column of radiating elements, a third additional radiating element and a fourth additional radiating element, where the first through fourth additional radiating elements form a third column of radiating elements that is positioned between the first column of radiating elements and the second column of radiating elements.

In some embodiments, the first additional radiating element is fed 180° out-of-phase with respect to a first radiating element in the first column of radiating elements that is closest to the first additional radiating element. In some embodiments, the second additional radiating element is fed 180° out-of-phase with respect to a second radiating element in the first column of radiating elements that is closest to the second additional radiating element.

In some embodiments, a first radiating element in the first column of radiating elements that is closest to the first additional radiating element is positioned at a top end of the first column of radiating elements, and a second radiating element in the first column of radiating elements that is closest to the second additional radiating element is positioned in a central position in the first column of radiating elements.

In some embodiments, a third radiating element in the second column of radiating elements that is closest to the third additional radiating element is positioned at a bottom end of the second column of radiating elements, and a fourth radiating element in the second column of radiating elements that is closest to the fourth additional radiating element is positioned in a central position in the second column of radiating elements.

In some embodiments, the first additional radiating element is vertically aligned with the first radiating element in the first column of radiating elements and is also vertically aligned with a fifth radiating element in the second column of radiating elements that is at a top end of the second column.

In some embodiments, a spacing between the second additional radiating element and the fourth additional radiating element is substantially the same as an average spacing between adjacent radiating elements in the first column of radiating elements.

In some embodiments, some of the radiating elements in the first array of radiating elements each have a first dipole arm that extends at an angle of −45° with respect to a longitudinal axis of the first column of radiating elements and a second dipole arm that extends at an angle of +45° with respect to the longitudinal axis of the first column of radiating elements, and other of the radiating elements in the first array each have a first dipole arm that extends parallel to the longitudinal axis of the first column of radiating elements and a second dipole arm that extends perpendicularly to the longitudinal axis of the first column of radiating elements.

In some embodiments, the first and second additional radiating elements are both positioned on a same side of the third and fourth additional radiating elements. In other embodiments, the second additional radiating element is positioned in between the third additional radiating element and the fourth additional radiating element.

Pursuant to still further embodiments of the present invention, base station antennas are provided that include a first RF port, and a first array of radiating elements that includes a first column of radiating elements and a first additional radiating element, where each of the radiating elements in the first array of radiating elements are coupled to the first RF port. Some of the radiating elements in the first array of radiating elements each have a first dipole arm that extends at an angle of −45° with respect to a longitudinal axis of the first column of radiating elements and a second dipole arm that extends at an angle of +45° with respect to the longitudinal axis of the first column of radiating elements, and other of the radiating elements in the first array of radiating elements each have a first dipole arm that extends parallel to the longitudinal axis of the first column of radiating elements and a second dipole arm that extends perpendicularly to the longitudinal axis of the first column of radiating elements.

In some embodiments, the base station antenna further comprises a second RF port and a second array of radiating elements that includes a second column of radiating elements and a third additional radiating element, where each of the radiating elements in the second array of radiating elements are coupled to the second RF port. In such embodiments, some of the radiating elements in the second array of radiating elements each have a first dipole arm that extends at an angle of −45° with respect to a longitudinal axis of the first column of radiating elements and a second dipole arm that extends at an angle of +45° with respect to the longitudinal axis of the first column of radiating elements, and other of the radiating elements in the second array of radiating elements each have a first dipole arm that extends parallel to the longitudinal axis of the first column of radiating elements and a second dipole arm that extends perpendicularly to the longitudinal axis of the first column of radiating elements.

In some embodiments, the first dipole arm of the first additional radiating element and the first dipole arm the third additional radiating element each extend parallel to the longitudinal axis of the first column of radiating elements.

In some embodiments, the first array of radiating elements further includes a second additional radiating element and the second array of radiating elements further includes a fourth additional radiating element, where the first dipole arm of the second additional radiating element and the first dipole arm the fourth additional radiating element each extend parallel to the longitudinal axis of the first column of radiating elements.

In some embodiments, the first and second additional radiating elements are vertically offset from the first column of radiating elements, and the third and fourth additional radiating elements are vertically offset from the second column of radiating elements.

In some embodiments, the first through fourth additional radiating elements form a third column of radiating elements that is positioned between the first column of radiating elements and the second column of radiating elements.

In some embodiments, the first additional radiating element is fed 180° out-of-phase with respect to a first radiating element in the first column of radiating elements that is closest to the first additional radiating element.

In some embodiments, a first radiating element of the first array of radiating elements that is closest to the first additional radiating element is positioned at a top end of the first column of radiating elements, and a second radiating element of the first array of radiating elements that is closest to the second additional radiating element is positioned in a central position in the first column of radiating elements.

In some embodiments, the first and second additional radiating elements are both positioned on a same side of the third and fourth additional radiating elements.

DETAILED DESCRIPTION

Pursuant to embodiments of the present invention, base station antennas are provided that include two arrays of low-band radiating elements and that have smaller widths than comparable conventional base station antennas. The base station antennas according to embodiments of the present invention may include "F-style arrays of radiating elements," meaning that the radiating elements of each low-band array, when viewed from the front, form one of (1) a shape of the letter F, (2) the shape of an upside down letter F, the shape of an inverted letter F or (4) the shape of an upside down and inverted letter F. Each F-style array includes a vertically-extending column of radiating elements (corresponding to the long vertical component of the letter "F") and first and second additional radiating elements. The first additional radiating element together with the top radiating element in the column form the top horizontal bar of the letter F, and the second additional radiating element together with one of the central radiating elements in the column, form the lower horizontal bar of the letter F. Since an F-style array of radiating elements has two radiating elements that are horizontally offset from the vertically-extending column of radiating elements, an F-style array will generate low-band antenna beams having narrower azimuth beamwidths as compared to comparable versions of the base station antennas of FIGS. 2A-2C. This is particularly true as the radiating elements at the top and bottom of most antenna arrays are typically fed less RF energy than the radiating elements in more central positions (in the vertical direction) in the array, and hence positioning one of the horizontally offset radiating elements near the middle of the array (in the vertical direction) acts to narrow the azimuth beamwidth more than a horizontally-offset radiating element that is positioned at or near the top or bottom of the array.

Figure 1:
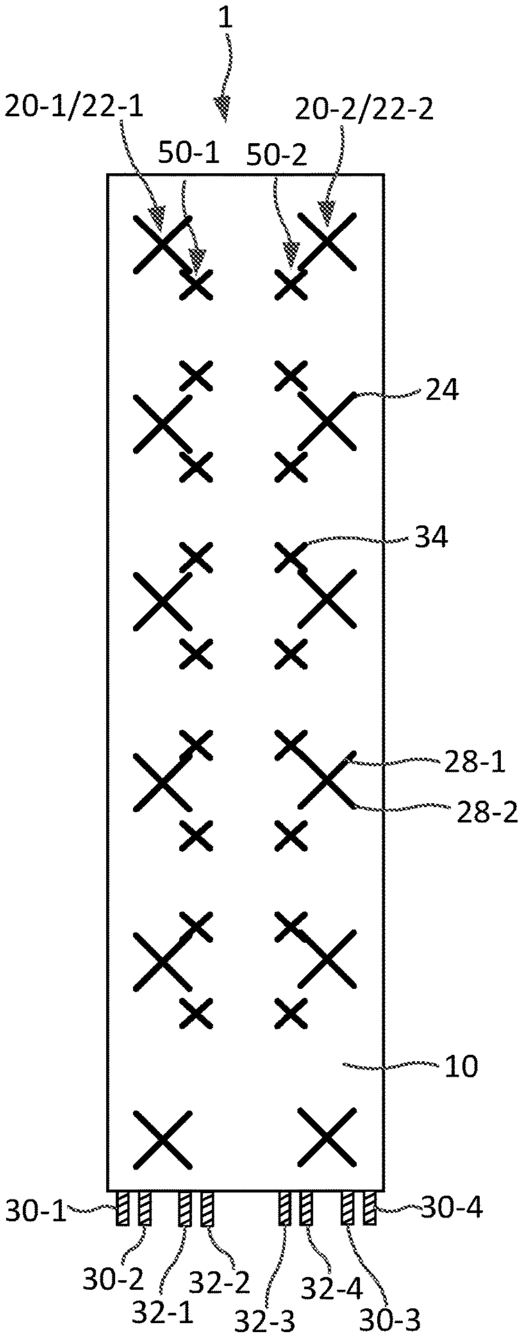
FIG. 1 (Prior Art)
FIG. 1 is a schematic front view of a conventional base station antenna (with the radome removed) that supports 4×MIMO communications in the low-band frequency range.
Figure 2A:
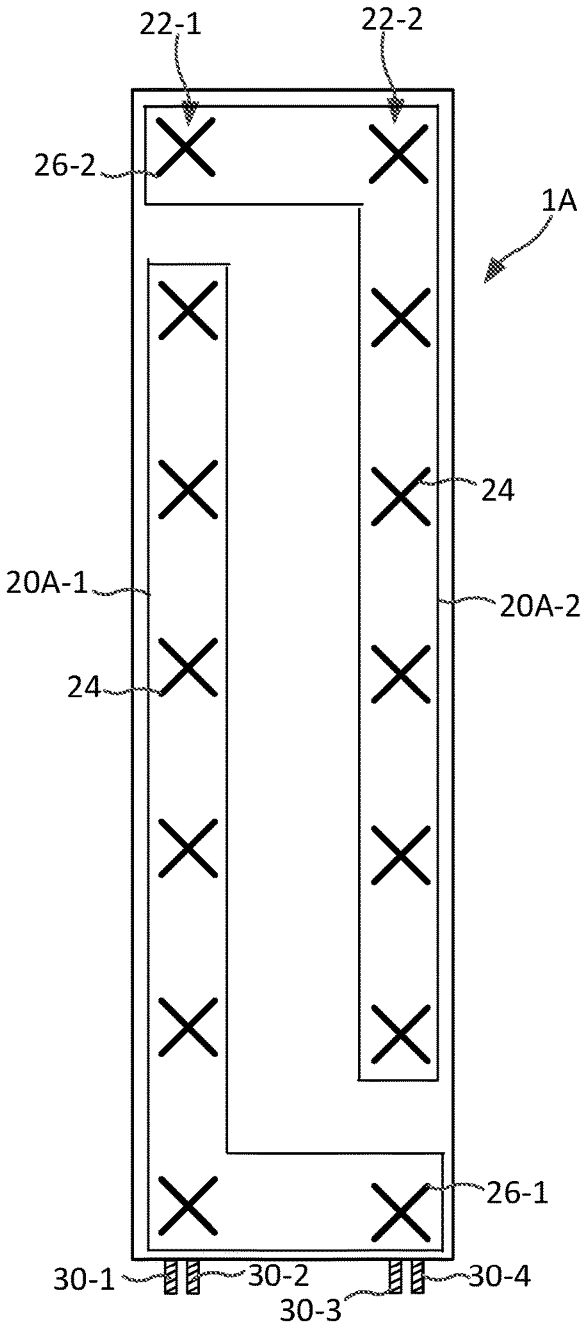
FIG. 2A (Prior Art)
FIGS. 2A-2C are schematic front views of several conventional base station antennas (with the radomes thereof removed) that have two low-band arrays that have increased horizontal apertures that generate antenna beams having reduced azimuth HPBWs.
Figure 2B:
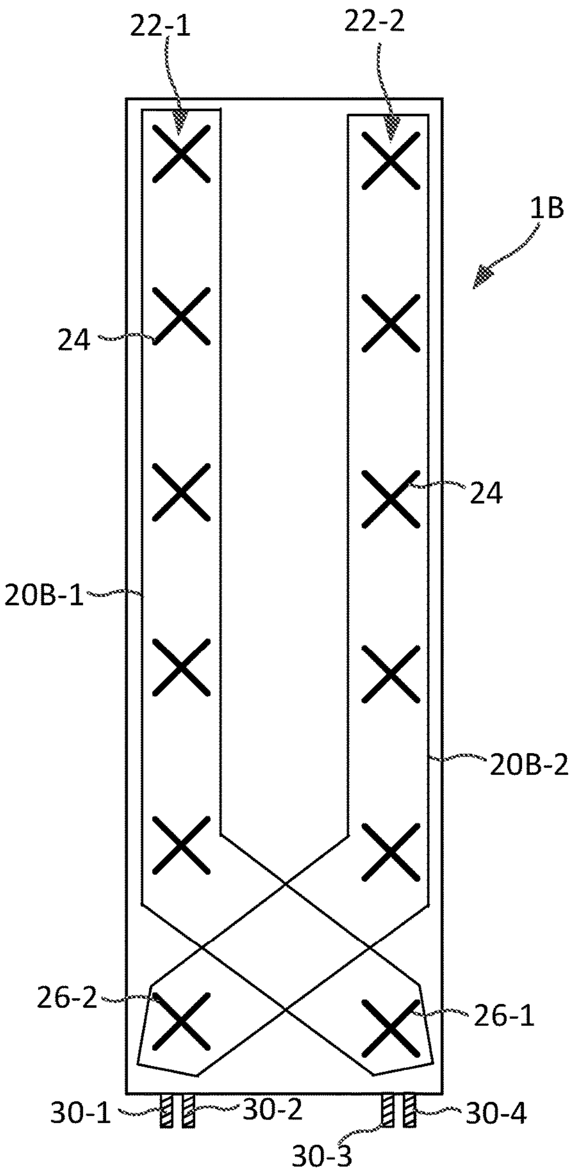
FIG. 2B (Prior Art)
Figure 2C:
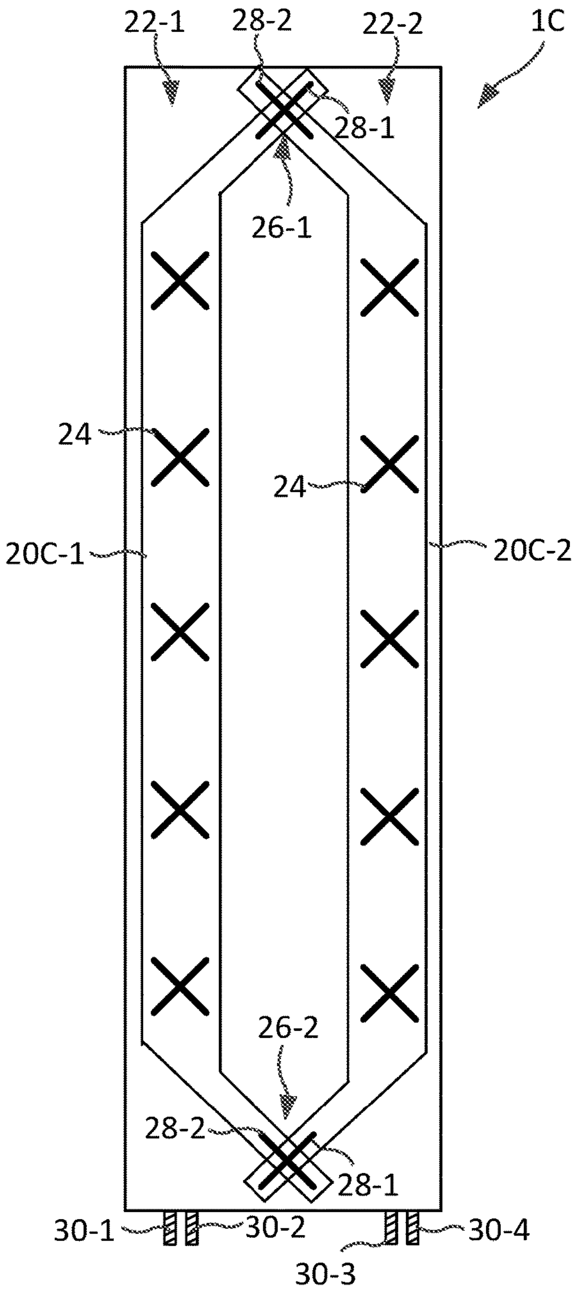
FIG. 2C (Prior Art)

Since the base station antennas according to embodiments of the present invention generate antenna beams having narrower azimuth beamwidths, they will typically exhibit higher gain than the low-band antenna beams generated by comparable conventional base station antennas such as the base station antennas of FIGS. 2A-2C. Alternatively, the base station antennas according to embodiments of the present invention may be implemented using smaller low-band radiating elements (which typically have larger "element" azimuth HPBWs, which can be compensated for by the reduced "array" azimuth HPBW), which may allow the width of the base station antenna to be reduced while providing comparable performance to conventional base station antennas such as the base station antennas of FIGS. 2A-2C.

In some embodiments, the above-described base station antennas may include a mixture of different types of low-band radiating elements. For example, smaller low-band radiating elements may be used to implement the horizontally-offset radiating elements in the F-style arrays, and/or smaller low-band radiating elements may be used to implement the radiating elements in the vertically-extending columns of the F-style arrays that are closest to the horizontally-offset radiating elements. This may facilitate reducing unwanted coupling between the two low-band arrays and/or allow the vertically-extending columns of the two arrays to be positioned closer together. In some embodiments, the different types of radiating elements may have different length dipole arms. In other embodiments, the different types of radiating elements may include first radiating elements that have dipole arms that extend along respective first and second axes and second radiating elements that have dipole arms that extend along respective third and fourth axes that are rotationally offset from the first and second axes.

Thus, in some embodiments of the present invention, base station antennas are provided that include first and second RF ports, a first array of radiating elements that includes a first column of radiating elements, a first additional radiating element and a second additional radiating element, where each of the radiating elements in the first array of radiating elements are coupled to the first RF port and not to the second RF port, and a second array of radiating elements that includes a second column of radiating elements, a third additional radiating element and a fourth additional radiating element, where each of the radiating elements in the second array of radiating elements are coupled to the second RF port and not to the first RF port. The first through fourth additional radiating elements may form a third column of radiating elements that is positioned between the first column of radiating elements and the second column of radiating elements.

In other embodiments, base station antennas are provided that include a reflector, a first RF port and a first array of radiating elements mounted to extend forwardly from the reflector, where the radiating elements of the first array form a first F-style array of radiating elements, where each of the radiating elements in the first array is coupled to the first RF port.

In still other embodiments, base station antennas are provided that include a first RF port and a first array of radiating elements that includes a first column of radiating elements and a first additional radiating element, where each of the radiating elements in the first array of radiating elements are coupled to the first RF port. Some of the radiating elements in the first array of radiating elements each have a first dipole arm that extends at an angle of −45° with respect to a longitudinal axis of the first column of radiating elements and a second dipole arm that extends at an angle of +45° with respect to the longitudinal axis of the first column of radiating elements, and other of the radiating elements in the first array of radiating elements each have a first dipole arm that extends parallel to the longitudinal axis of the first column of radiating elements and a second dipole arm that extends perpendicularly to the longitudinal axis of the first column of radiating elements.

Embodiments of the present invention will now be discussed in more detail with reference to FIGS. 3A-9.

Figure 3A:
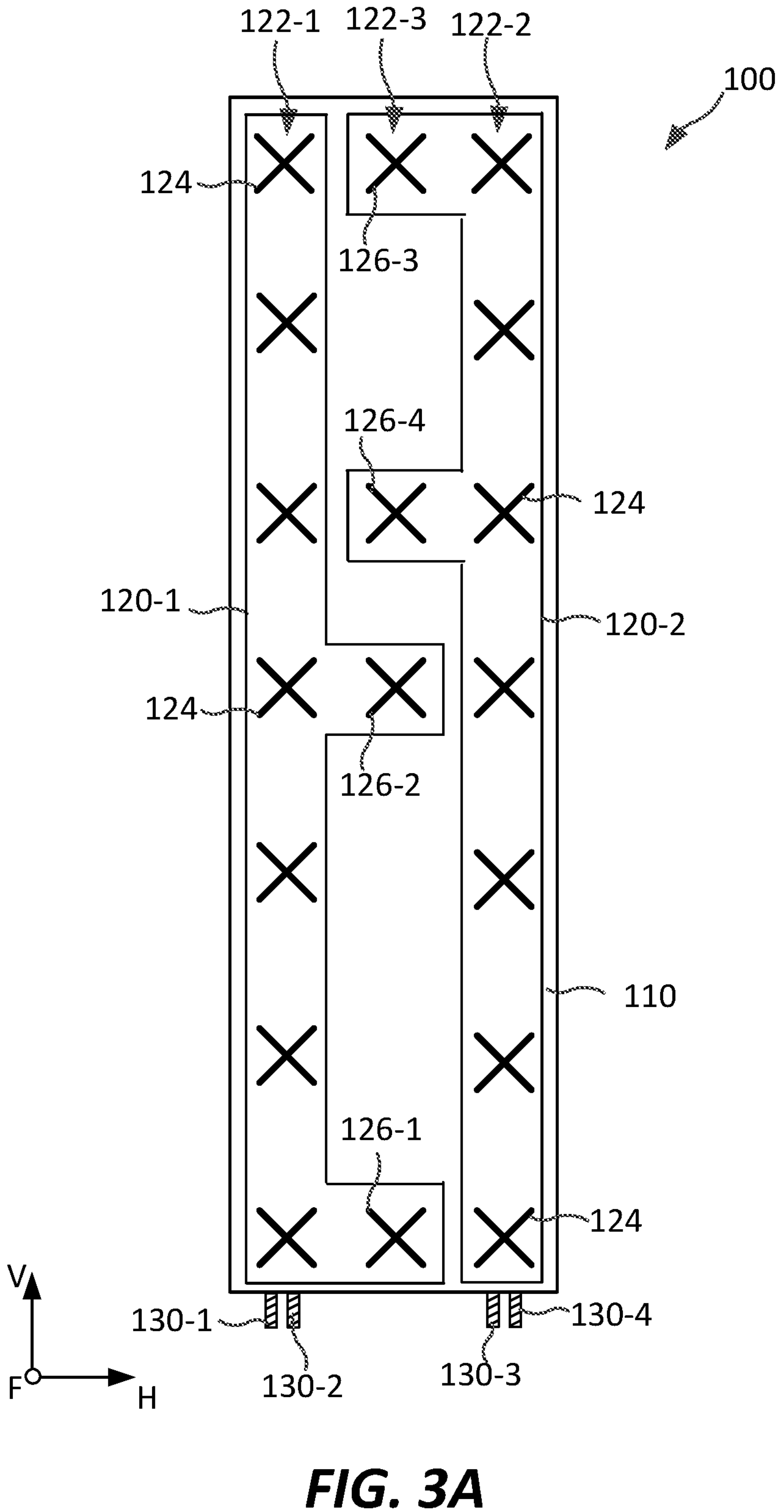
FIG. 3A is a schematic front view of a base station antenna (with the radome removed) according to embodiments of the present invention that has two F-style low-band arrays.
Figure 3B:
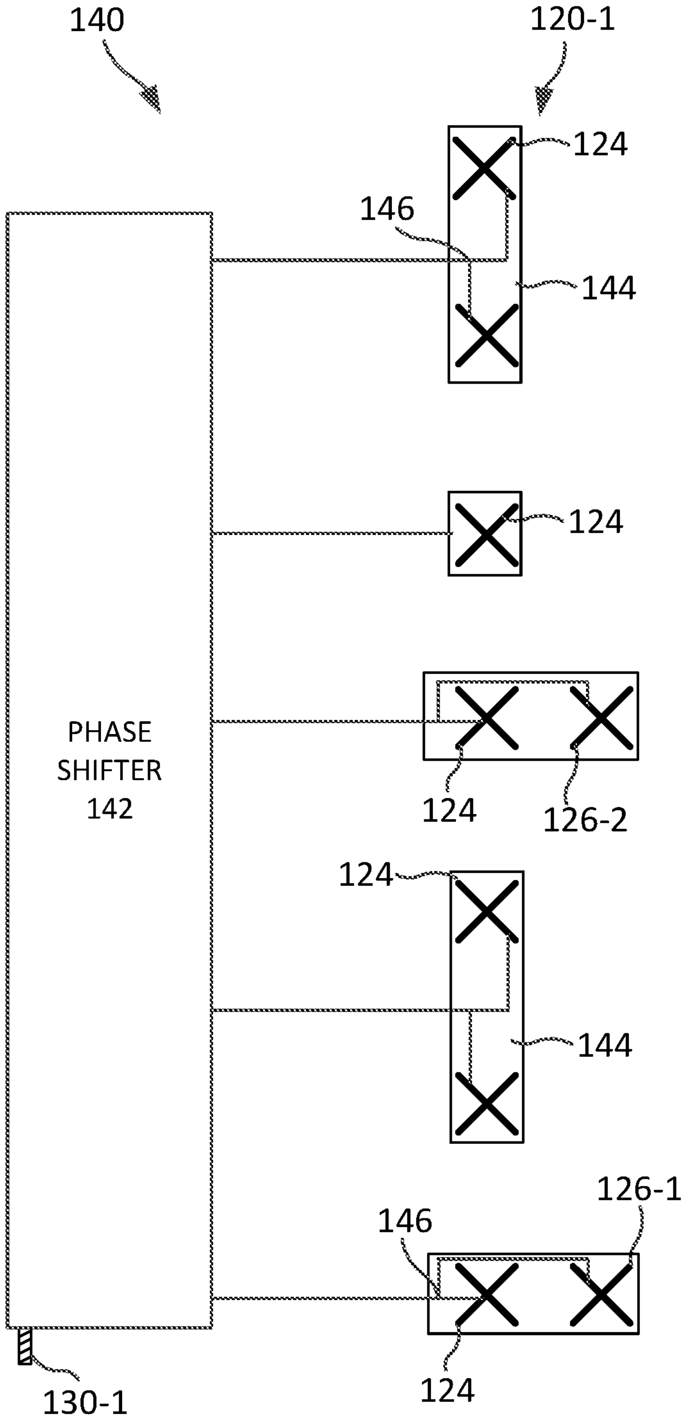
FIG. 3B is a block diagram of one of the feed networks included in the base station antenna of FIG. 3A.
Figure 9:
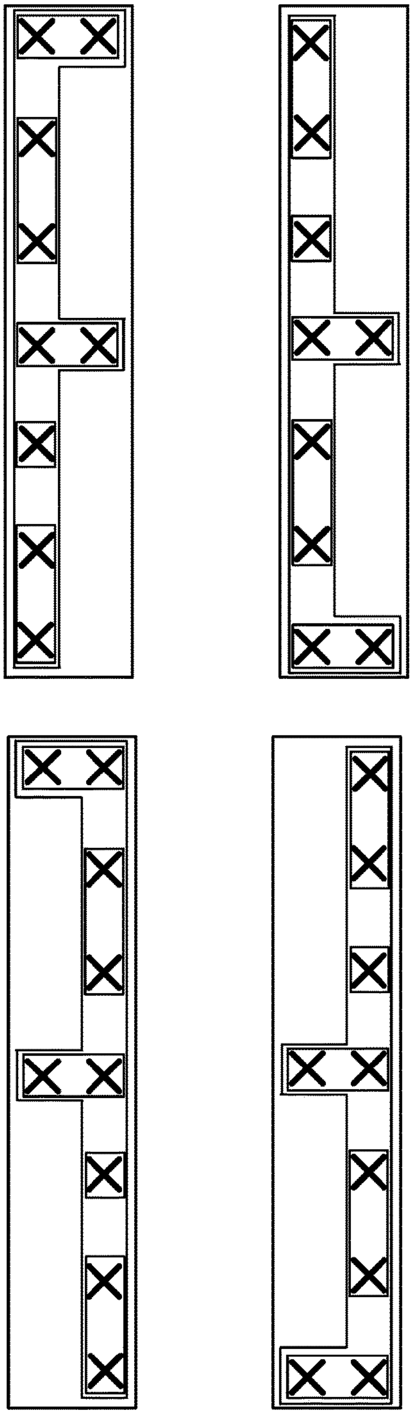
FIG. 9 is a schematic front view of four different configurations of an F-style array of radiating elements.

FIG. 3A is a schematic front view of a base station antenna 100 according to embodiments of the present invention that includes a pair of F-style arrays 120-1, 120-2 of low-band radiating elements 124,126. FIG. 3B is a block diagram of one of the feed networks included in base station antenna 100 of FIG. 3A. As noted above, an "F-style" array refers to an array of radiating elements which, when viewed from the front has the shape of the letter F, the shape of an upside-down letter F, the shape of an inverted letter F, or the shape of an upside down and inverted letter F. For clarity, FIG. 9 illustrates F-style arrays having each of the above configurations. In base station antenna 100, the left F-style array 120-1 has the shape of an upside-down letter F, and the right F-style array 120-2 has the shape of an inverted letter F.

Referring to FIG. 3A, the base station antenna 100 includes a reflector 110. The reflector 110 may comprise, for example, a sheet of metal that serves as a ground plane for the radiating elements 124, 126 of the F-style arrays 120 and that also redirects forwardly much of the backwardly-directed radiation emitted by the radiating elements 124, 126. The radiating elements 124, 126 are mounted to extend from the reflector 110 in a forward direction F. The radiating elements 124, 126 may be low-band radiating elements that are configured to operate in some or all of the 617-960 MHz "low-band" frequency range. Each radiating element 124, 126 may comprise, for example, a −45°/+45° cross-dipole radiating element that has a first dipole radiator 128-1 that extends at an angle of −45° with respect to the longitudinal axis of the antenna 100 and a second dipole radiator 128-2 that extends at an angle of +45° with respect to the longitudinal axis of the antenna 100. Thus, the radiating elements 124, 126 are schematically illustrated in FIG. 3A (and the other figures herein) using X's, where each line of the X represents a dipole radiator 128-1, 128-2.

The first F-style array 120-1 comprises a first column 122-1 of radiating elements 124 as well as first and second additional radiating elements 126-1, 126-2 that are offset in the horizontal direction from the first column 122-1 of radiating elements 124. The first F-style array 120-1 has the shape of an upside-down letter F. The second F-style array 120-2 comprises a second column 122-2 of radiating elements 124 as well as third and fourth additional radiating elements 126-3, 126-4 that are offset in the horizontal direction from the second column 122-2 of radiating elements 124. The second F-style array 120-2 has the shape of an inverted letter F. Radiating elements 124, 126 may have the exact same design/construction in some embodiments. Different reference numerals are used for radiating elements 124 and 126 to highlight the fact that the additional radiating elements 126 are offset horizontally from the radiating elements 124, which (for each array 120) are aligned in a column. This same convention is used throughout this application. The columns 122-1 and 122-2 are arranged side-by-side. The first and second additional radiating elements 126-1, 126-2 are offset in the horizontal direction from the first column 122-1 of radiating elements 124 toward the second column 122-2 of radiating elements 124 and the third and fourth additional radiating elements 126-3, 126-4 are offset in the horizontal direction from the second column 122-2 of radiating elements 124 toward the first column 122-1 of radiating elements 124. Consequently, the first through fourth additional radiating elements 126-1 through 126-4 may be aligned in a third column 122-3 that is interposed between the first column 122-1 and the second column 122-2.

Each column 122 may extend along an axis that is parallel to a longitudinal axis of the base station antenna 100. Since the longitudinal axis of the base station antenna 100 will typically extend substantially vertically with respect to a horizontal plane defined by the horizon when the base station antenna 100 is mounted for use, the columns 122 will be vertically-extending columns that extend in a vertical direction V. The columns 122 may be spaced apart from each other in the horizontal direction H.

The base station antenna 100 further includes four RF ports 130-1 through 130-4. Each RF port 130 may have a connector interface that allows the RF port 130 to connect to a port of an external radio (e.g., via a coaxial cable). Each RF port 130 is connected to a respective one of first through fourth feed networks 140 (see FIG. 3B) that connect each RF port 130 to selected ones of the dipole radiators 128 of the radiating elements 124, 126. In particular, the first feed network may connect the first RF port 130-1 to the first dipole radiators 128-1 of the radiating elements 124, 126-1, 126-2 that form the first array 120-1, and the third feed network may connect the third RF port 130-3 to the second dipole radiators 128-2 of the radiating elements 124, 126-1, 126-2 that form the first array 120-1. Similarly, the second feed network may connect the second RF port 130-2 to the first dipole radiators 128-1 of the radiating elements 124, 126-3, 126-4 that form the second array 120-2, and the fourth feed network may connect the fourth RF port 130-4 to the second dipole radiators 128-2 of the radiating elements 124, 126-3, 126-4 that form the second array 120-2. Each feed network may include, for example, power dividers and electromechanical phase shifters that sub-divide RF signals received at an RF port 130 that is connected to the feed network into a plurality of sub-components, apply a phase progression to the sub-components of the RF signal, and feed the sub-components to the dipole radiators 128 of the individual radiating elements 124, 126 (or groups thereof).

The base station antenna 100 will generate an antenna beam in response to an RF signal input at each RF port 130. Thus, base station antenna 100 may simultaneously generate four antenna beams by inputting RF signals at each of the four RF ports 130-1 through 130-4. Thus, base station antenna 100 can support 4×MIMO communications.

As described above, the azimuth HPBW of an antenna beam generated by an array of radiating elements will be a function of (1) the azimuth beamwidth of the element patterns generated by each radiating element in the array, (2) the extent that the radiating elements in the array are spaced apart in the azimuth plane (the "aperture" of the array in the azimuth plane) and (3) the relative amount of power fed to each radiating element. Ideally, radiating elements for three-sector base station antennas are designed to generate element patterns that have an azimuth HPBW of about 65° so that a single vertically-extending column of radiating elements will generate an antenna beam having an azimuth HPBW of about 65°, which is a suitable antenna beam shape for covering a 120° sector of a base station. However, since low-band radiating elements that are designed to cover the full 617-960 MHz frequency band are large in size—making it difficult to fit two arrays of such low-band radiating elements within operator size constraints for base station antennas—base station antenna manufacturers often reduce the size of these radiating elements. However, the slightly smaller radiating elements will have increased HPBWs in both the azimuth and elevation planes. The increased beamwidth in the elevation plane may be compensated for by adding an additional radiating element to the linear array (thereby increasing the aperture of the array in the elevation plane). In the azimuth plane, the techniques discussed above with respect to FIGS. 2A-2C are typically used to reduce the azimuth HPBW to be closer to 65°.

As discussed above, the arrays 120-1 and 120-2 of base station antenna 100 are each implemented as F-style arrays that each include a vertically-extending column 122 of radiating elements 124 and a pair of additional radiating elements 126 that are offset in the horizontal direction from the respective columns 122 of radiating elements 124. The first additional radiating element 126-1 of the first array 120-1 is positioned adjacent (and horizontally aligned with) the bottom radiating element 124 in the first column 122-1, and the second additional radiating element 126-2 of the first array 120-1 is positioned adjacent a radiating element 124 that is in a central position of the first column 122-1 (namely the middle radiating element 124 in the first column 122-1). The third additional radiating element 126-3 of the second array 120-2 is positioned adjacent (and horizontally aligned with) the top radiating element 124 in the second column 122-2, and the fourth additional radiating element 126-4 of the second array 120-2 is positioned adjacent a radiating element 124 that is in a central position of the second column 122-2 (namely the third radiating element 124 from the top in the second column 122-2).

As discussed above, conventionally the radiating elements in the central portion of a linear array receive a greater proportion of the RF signals transmitted through the array than do the radiating elements that are near or at the top/bottom of the linear array. For example, a radiating element in the center of an array may receive as much as twice the RF power that the radiating elements at the top and bottom of the array receive. Consequently, the horizontally offset radiating elements F-style arrays 120-1, 120-2 may narrow the azimuth beamwidth by perhaps three times the amount that the arrays of FIGS. 2A-2C narrow the azimuth beamwidth (in each case as compared to a linear array).

In some embodiments, some or all of the first through fourth additional radiating elements 126-1 through 126-4 may be fed out-of-phase with respect to the radiating elements 124 in the first and second columns 122-1, 122-2 of radiating elements. In a conventional linear array, all of the radiating elements of the linear array are fed in-phase with each other (although a separate phase taper may be applied to impart an electronic downtilt to the generated antenna beams). In contrast to this conventional approach, some or all of the first through fourth additional radiating elements 126-1 through 126-4 may be fed 180° out-of-phase with respect to the radiating elements 124 in the first and second columns 122-1, 122-2 of radiating elements. Feeding the first through fourth additional radiating elements 126-1 through 126-4 180° out-of-phase with respect to the radiating elements 124 in the first and second columns 122-1, 122-2 of radiating elements may help reduce coupling between the first and second additional radiating elements 126-1, 126-2 and the radiating elements of the second array 120-2 and may likewise reduce coupling between the third and fourth additional radiating elements 126-3, 126-4 and the radiating elements of the first array 120-1.

As can be seen from FIG. 3A, each additional radiating element 126 in the third (central) column 122-3 is horizontally aligned with a respective radiating element 124 in each of the first and second columns 122-1, 122-2. As such, arrays 120-1, 120-2 together have five rows of radiating elements that each have two horizontally aligned radiating elements 124 and two rows of radiating elements that each have a total of three horizontally aligned radiating elements 124, 126. As can be seen, the first and second additional radiating elements 126-1, 126-2 of the first array 120-1 are in the bottom row and the middle row, and hence two rows of radiating elements 124 are positioned between the rows that include the first and second additional radiating elements 126-1, 126-2 of the first array 120-1. The third and fourth additional radiating elements 126-3, 126-4 of the second array 120-2 are in the top row and the third row from the top row, and hence one row of radiating elements 124 is positioned between the rows that include the third and fourth additional radiating elements 126-3, 126-4 of the second array 120-2. It can also be seen that a vertical offset or "spacing" between the second additional radiating element 126-2 and the fourth additional radiating element 126-4 is substantially the same as an average spacing between adjacent radiating elements 124 in the first column 120-1 of radiating elements.

While not shown in FIG. 3A, base station antenna 100 may further include additional arrays of radiating elements such as, for example, two or four linear arrays of mid-band radiating elements (not shown). The same is true with respect to each base station antenna discussed below.

FIG. 3B is a block diagram that schematically illustrates one of the four feed networks 140 of base station antenna 100 of FIG. 3A. As shown in FIG. 3B, the feed network 140 includes a phase shifter 142. The phase shifter 142 sub-divides RF signals received from RF port 130-1 into a plurality of sub-components and applies a phase progression or "taper" to the sub-components of the RF signal. The phase tapered sub-components of the RF signal are output at the five output ports of the phase shifter 142. Each of the phase shifter output ports is connected to feed board printed circuit board 144. Four of the feed board printed circuit boards 144 each have two radiating elements 124, 126 mounted thereon, while the fifth feed board printed circuit board 144 has a single radiating element 124 mounted thereon. Each feed board printed circuit board 144 that includes two radiating elements 124, 126 further includes a respective 1×2 power divider 146 that further sub-divides each sub-component of the RF signal into two smaller power sub-components, that are fed to the −45° dipole radiators 128-1 of the two radiating elements 124, 126 mounted on the respective feed board printed circuit boards 144. The second through fourth feed networks 140 (not shown) may have the same design except that they connect the remaining three RF ports 130-2 through 130-4 to the second dipole radiators 128-2 of the first array 120-1, to the first dipole radiators 128-1 of the second array 120-2, and to the second dipole radiators 128-2 of the second array 120-2, respectively.

The base station antenna 100 will generate an antenna beam in response to an RF signal input at each of the RF ports 130. Thus, base station antenna 100 may simultaneously generate four antenna beams by inputting RF signals at each of the four RF ports 130-1 through 130-4. The radiating elements 124 and the radiating elements 126 may have identical designs in some embodiments. In some embodiments, a number of first radiating elements 124 in the first array 120-1 may be equal to a number of radiating elements 124 in the second array 120-2.

FIGS. 4-8 schematically illustrate base station antennas 200, 300, 400, 500 and 600, respectively, according to further embodiments of the present invention. Elements of these base station antennas that are identical to corresponding elements of base station antenna 100 are labeled with the same reference numeral and generally are not further discussed. The discussion below of the base station antennas of FIGS. 4-8 focuses on the differences between base station antenna 100 and base station antennas 200, 300, 400, 500 and 600.

Figure 4:
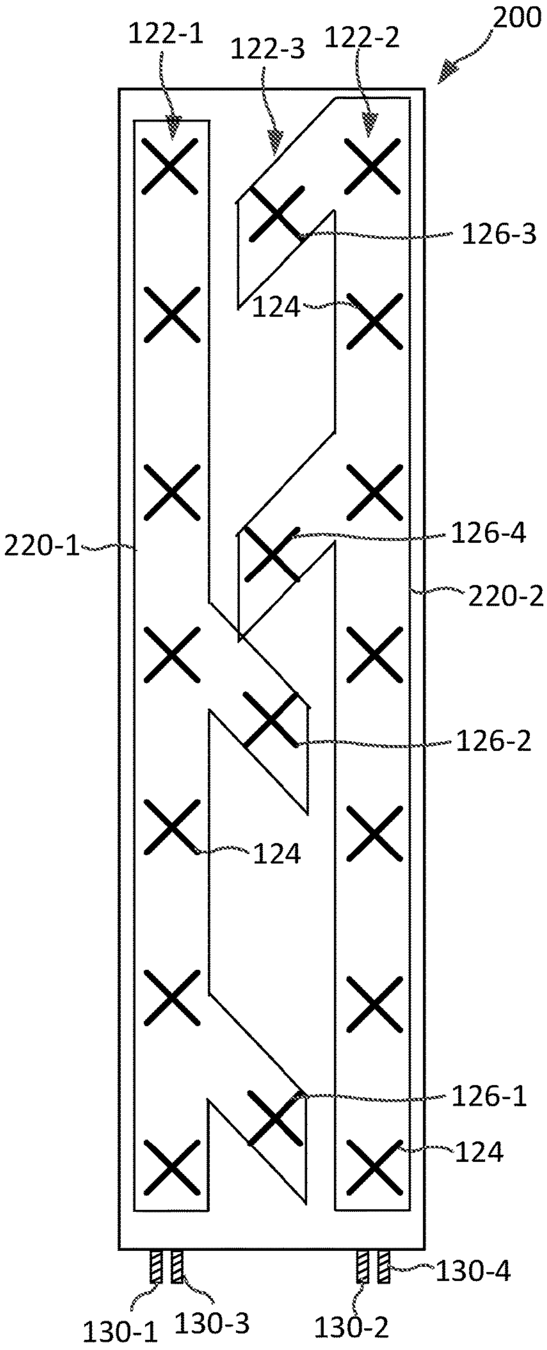
FIGS. 4-8 are schematic front views of base station antennas (with the radomes thereof removed) according to further embodiments of the present invention that each include two F-style low-band arrays.

As noted above, base station antenna 100 includes F-style arrays in which the additional radiating elements 126 in the third (central) column 122-3 are horizontally aligned with a radiating element 124 in each of the first and second columns 122-1,122-2, such that base station antenna 100 has a plurality of rows that each have two horizontally aligned radiating elements 124 and two rows that have a total of three horizontally aligned radiating elements 124, 126. It will be appreciated, however, that embodiments of the present invention are not limited thereto. For example, FIG. 4 schematically depicts a base station antenna 200 according to further embodiments of the present invention that includes two F-style low-band arrays 220-1, 220-2 where the additional radiating elements 126 are vertically offset with respect to the radiating elements 124 in the first and second columns 122-1, 122-2 of the respective F-style arrays 220-1, 220-2.

One potential issue with base station antenna 100 is that the provision of two additional radiating elements 126 per array 120 means that there may be increased coupling between the two low-band arrays 120 as compared to the coupling experienced between the two low-band arrays of the base station antennas of FIGS. 2A-2C. One way to reduce this coupling is to vertically stagger the additional radiating elements 126 with respect to the closest radiating elements 124 in the first and second columns 122-1, 122-2. For example, each additional radiating element 126 may be vertically offset from the respective radiating elements in the first and second columns that they are closest too by about one third to one half the average vertical spacing between the radiating elements in the first columns 122-1 (or the second column 122-2). By staggering the additional radiating elements 126 in the vertical direction with respect to the radiating elements 124 in the first and second columns 122-1, 122-2, the isolation between the first and second F-style array 120-1, 120-2 may be increased. While this vertical stagger make the appearance of each array somewhat less like the letter F (or an upside down and/or inverted F), such arrays are still considered to be F-style arrays.

Figure 5:
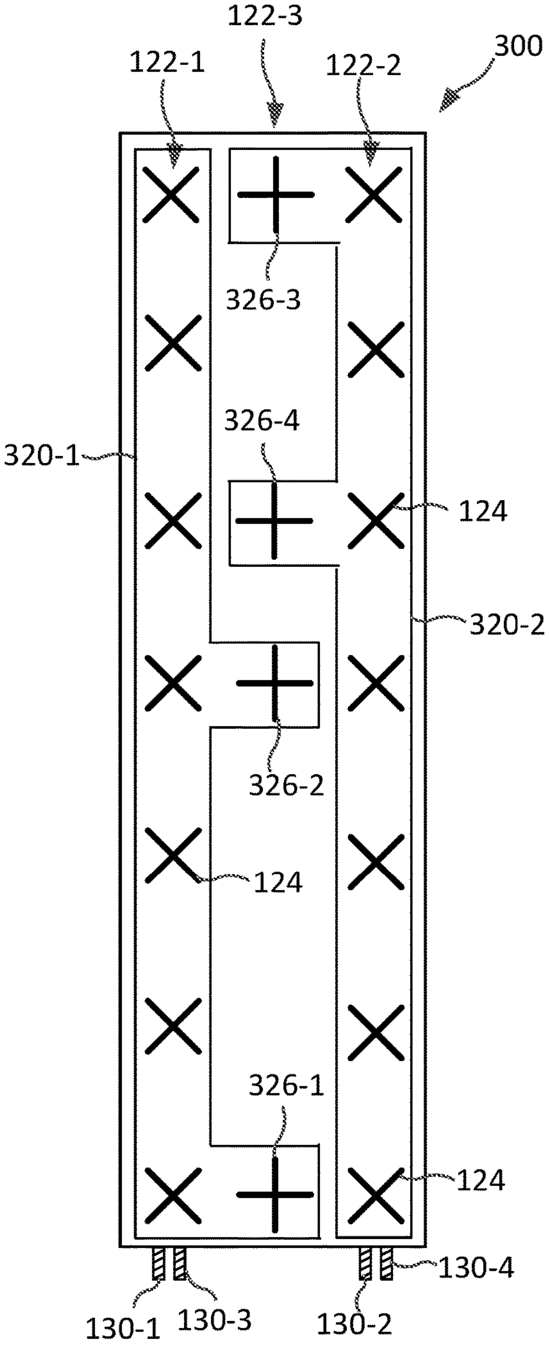
Figure 6:
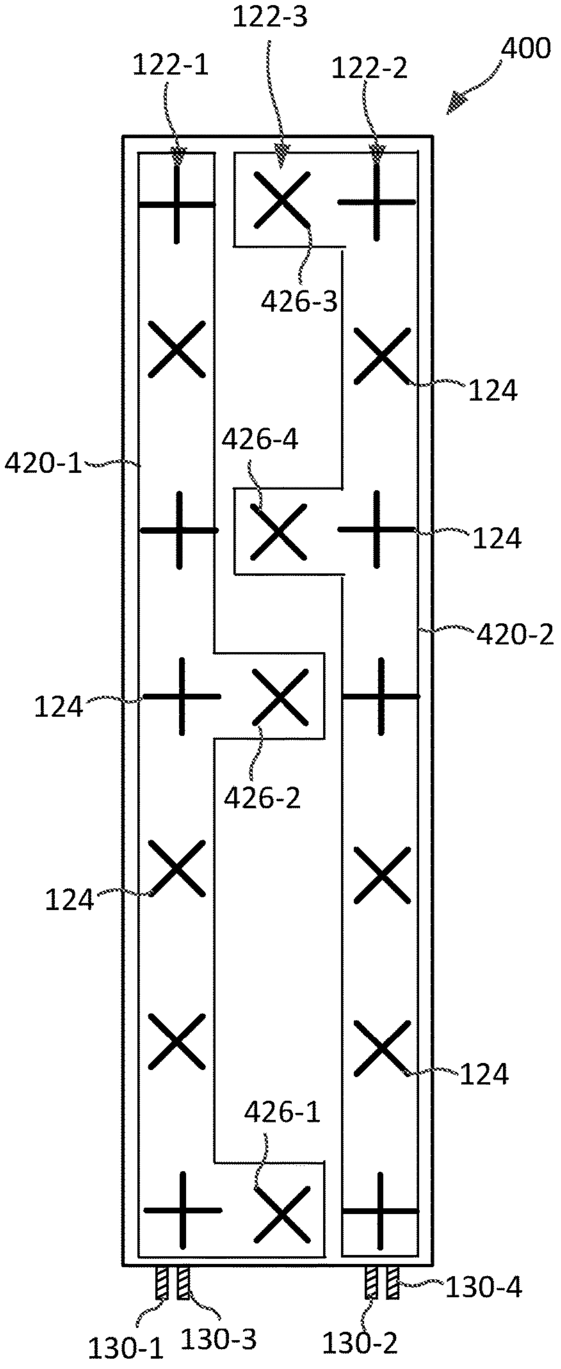

FIGS. 5 and 6 schematically depict base station antennas 300 and 400 according to still further embodiments of the present invention that include F-style low-band arrays 320-1, 320-2; 420-1, 420-2 that use at least two different types of low-band radiating elements 124, 326 in order to further increase the isolation between the two low-band arrays 320-1, 320-2; 420-1, 420-2. In particular, radiating elements of the first array 320-1; 420-1 that are positioned close to radiating elements of the respective second array 320-2; 420-2 are implemented using different radiating element types to effectively increase the distance between these radiating elements, and hence the isolation therebetween.

Referring first to FIG. 5, a base station antenna 300 is shown that is identical to base station 100 except that the four additional radiating elements 126-1 through 126-4 of base station antenna 100 are replaced in base station antenna 300 with specially-fed dual-polarized radiating elements 326-1 through 326-4 that have dipole arms that extend vertically and horizontally that are fed to emit slant −45° or +45° polarized radiation. Examples of such radiating elements are disclosed, for example, in PCT Patent Publication No. WO 2021/133577, filed Dec. 14, 2020, the entire content of which is incorporated herein by reference. By having the dipole arms of radiating elements 326-1 through 326-4 rotated 45° with respect to the dipole arms of radiating elements 124 the minimum distance between each additional radiating element 326 and the closest radiating element 124 from the other array 320 may be increased, which may increase isolation between the two low-band arrays 320-1, 320-2.

As shown in FIG. 6, base station antenna 400 is similar to base station antenna 300, but in base station 400 the first through fourth additional radiating elements 426-1 through 426-4 are implemented using standard slant −45°/+45° cross-dipole radiating elements, as are most of the radiating elements 124 in the first and second columns 122-1, 122-2. However, the four radiating elements in each column 122-1, 122-2 that are in the same row as an additional radiating element 426 are implemented using the above-discussed specially-fed dual-polarized radiating elements that have dipole arms that extend vertically and horizontally that are fed to emit slant −45° or +45° polarized radiation. It will be appreciated that other mixtures of standard slant −45°/+45° cross-dipole radiating elements and specially-fed dual-polarized radiating elements may be used in further embodiments of the present invention.

Figure 7:
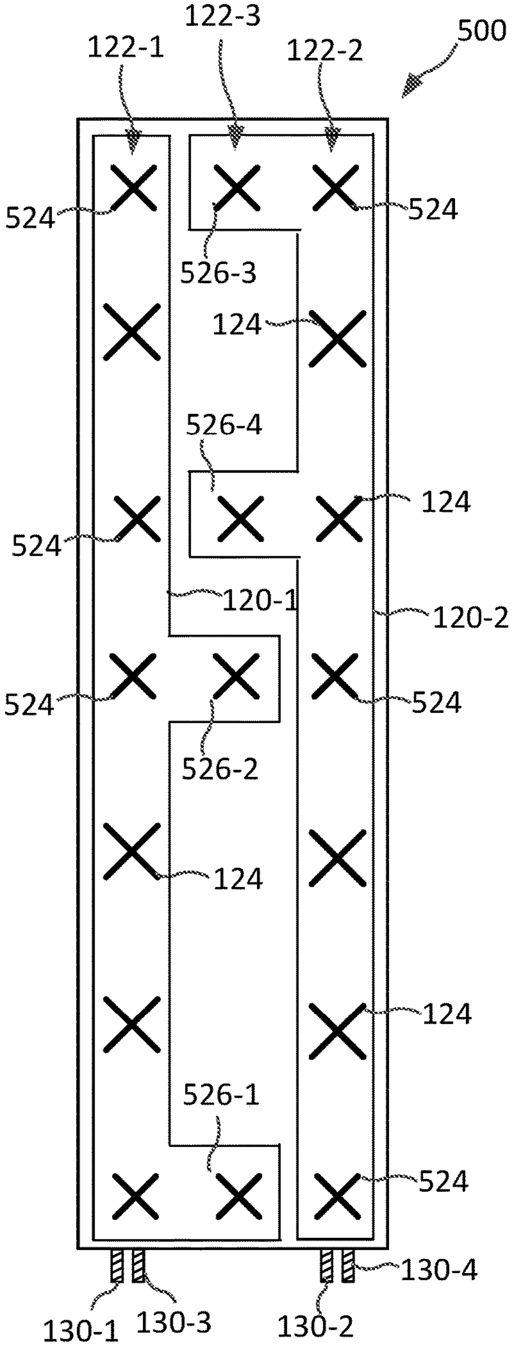

FIG. 7 schematically depicts a base station antenna 500 according to further embodiments of the present invention that includes F-style arrays 520-1, 520-2 of low-band radiating elements that have two different sizes of low-band radiating elements. In particular, as shown in FIG. 7, each array 520 is implemented as a column of low-band radiating elements 124, 524 and two additional low-band radiating elements 526. All of the radiating elements 124, 524, 526 are standard slant −45°/+45° cross-dipole radiating elements. However, radiating elements 124 have longer dipole arms than radiating elements 524, 526. The smaller radiating elements 524, 526 are used in the rows of radiating elements in base station antenna 500 that include three radiating elements, as this will help offset the increased coupling between the two F-style arrays 520-1, 520-2. In some embodiments, the dipole arms of radiating elements 524, 526 may be at least 10% smaller in end-to-end physical length than the dipole arms of radiating elements 124.

Figure 8:
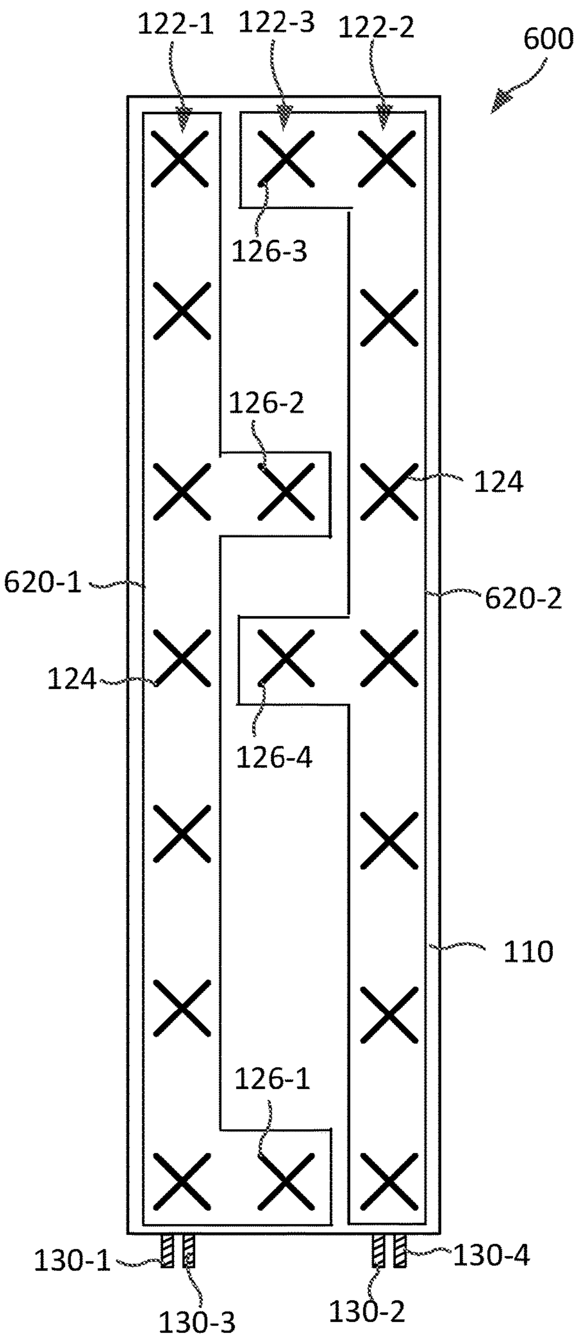

FIG. 8 schematically depicts a base station antenna 600 according to still further embodiments of the present invention. Base station antenna 600 is almost identical to base station antenna 100 of FIG. 3A, except that the positions of radiating elements 126-2 and 126-4 are reversed in base station antenna 600. In particular, in base station antenna 100, the first and second additional radiating elements 126-1, 126-2 are both positioned on a same side of the third and fourth additional radiating elements 126-3, 126-4. In contrast, in base station antenna 600, the second additional radiating element 126-2 is positioned in between the third additional radiating element 126-3 and the fourth additional radiating element 126-4.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Herein, the term “substantially” refers to variation of less than 10%.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term “and/or” includes any and all combinations of one or more of the associated listed items.

It will be understood that when an element is referred to as being “on” another element, it can be directly on the other element or intervening elements may also be present. In contrast, when an element is referred to as being “directly on” another element, there are no intervening elements present. It will also be understood that when an element is referred to as being “connected” or “coupled” to another element, it can be directly connected or coupled to the other element or intervening elements may be present. In contrast, when an element is referred to as being “directly connected”

or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A base station antenna, comprising:

a reflector;

a first radio frequency ("RF") port;

a second RF port;

a first array of radiating elements that includes a first column of radiating elements that extend forwardly from the reflector, a first additional radiating element and a second additional radiating element, where each of the radiating elements in the first array of radiating elements are coupled to the first RF port and not to the second RF port; and a second array of radiating elements that includes a second column of radiating elements, a third additional radiating element and a fourth additional radiating element, where each of the radiating elements in the second array of radiating elements are coupled to the second RF port and not to the first RF port;

wherein the first through fourth additional radiating elements form a third column of radiating elements that is positioned between the first column of radiating elements and the second column of radiating elements.

2. The base station antenna of claim 1, wherein the first array of radiating elements and the second array of radiating elements each comprise an F-style array of radiating elements.

3. The base station antenna of claim 1, wherein the first additional radiating element is fed 180° out-of-phase with respect to a first radiating element in the first column of radiating elements that is closest to the first additional radiating element.

4. The base station antenna of claim 3, wherein the second additional radiating element is fed 180° out-of-phase with respect to a second radiating element in the first column of radiating elements that is closest to the second additional radiating element.

5. The base station antenna of claim 1, wherein a first radiating element in the first column of radiating elements that is closest to the first additional radiating element is positioned at a top end of the first column of radiating elements, and a second radiating element in the first column of radiating elements that is closest to the second additional radiating element is positioned in a central position in the first column of radiating elements.

6. The base station antenna of claim 5, wherein a third radiating element in the second column of radiating elements that is closest to the third additional radiating element is positioned at a bottom end of the second column of radiating elements, and a fourth radiating element in the second column of radiating elements that is closest to the fourth additional radiating element is positioned in a central position in the second column of radiating elements.

7. The base station antenna of claim 6, wherein the first additional radiating element is horizontally aligned with the first radiating element in the first column of radiating elements and is also horizontally aligned with a fifth radiating element in the second column of radiating elements that is at a top end of the second column.

8. The base station antenna of claim 6, wherein the first additional radiating element is vertically offset from the first radiating element in the first column of radiating elements and is also vertically offset from a fifth radiating element in the second column of radiating elements that is at a top end of the second column.

9. A base station antenna, comprising:

a reflector;

a first radio frequency ("RF") port;

a second RF port;

a first array of radiating elements mounted to extend forwardly from the reflector, where the radiating elements of the first array form a first F-style array of radiating elements, where each of the radiating elements in the first array is coupled to the first RF port; and a second array of radiating elements mounted to extend forwardly from the reflector.

10. The base station antenna of claim 9, wherein the radiating elements of the second array form a second F-style array of radiating elements, where each of the radiating elements in the second array is coupled to the second RF port.

11. The base station antenna of claim 10, wherein the first array of radiating elements includes a first column of radiating elements, a first additional radiating element and a second additional radiating element, the second array of radiating elements includes a second column of radiating elements, a third additional radiating element and a fourth additional radiating element, where the first through fourth additional radiating elements form a third column of radiating elements that is positioned between the first column of radiating elements and the second column of radiating elements.

12. The base station antenna of claim 11, wherein a first radiating element in the first column of radiating elements that is closest to the first additional radiating element is positioned at a top end of the first column of radiating elements, and a second radiating element in the first column of radiating elements that is closest to the second additional radiating element is positioned in a central position in the first column of radiating elements.

13. The base station antenna of claim 11, wherein a spacing between the second additional radiating element and the fourth additional radiating element is substantially the same as an average spacing between adjacent radiating elements in the first column of radiating elements.

14. The base station antenna of claim 11, wherein the first and second additional radiating elements are both positioned on a same side of the third and fourth additional radiating elements.

15. The base station antenna of claim 11, wherein the second additional radiating element is positioned in between the third additional radiating element and the fourth additional radiating element.

16. A base station antenna, comprising:

a reflector;

a first radio frequency ("RF") port;

a second RF port;

a first array of radiating elements that includes a first column of radiating elements and a first additional radiating element, where each of the radiating elements in the first array of radiating elements are coupled to the first RF port; and a second array of radiating elements mounted to extend forwardly from the reflector;

wherein some of the radiating elements in the first array of radiating elements each have a first dipole arm that extends at an angle of −45° with respect to a longitudinal axis of the first column of radiating elements and a second dipole arm that extends at an angle of +45° with respect to the longitudinal axis of the first column of radiating elements, and other of the radiating elements in the first array of radiating elements each have a first dipole arm that extends parallel to the longitudinal axis of the first column of radiating elements and a second dipole arm that extends perpendicularly to the longitudinal axis of the first column of radiating elements;

wherein the second array of radiating elements includes a second column of radiating elements and a second additional radiating element, where each of the radiating elements in the second array of radiating elements are coupled to the second RF port;

wherein some of the radiating elements in the second array of radiating elements each have a first dipole arm that extends at an angle of −45° with respect to a longitudinal axis of the first column of radiating elements and a second dipole arm that extends at an angle of +45° with respect to the longitudinal axis of the first column of radiating elements, and other of the radiating elements in the second array of radiating elements each have a first dipole arm that extends parallel to the longitudinal axis of the first column of radiating elements and a second dipole arm that extends perpendicularly to the longitudinal axis of the first column of radiating elements; and wherein the radiating elements of the first array form a first F-style array of radiating elements.

17. The base station antenna of claim 16, wherein the first array of radiating elements further includes a second additional radiating element and the second array of radiating elements further includes a fourth additional radiating element, where the first dipole arm of the second additional radiating element and the first dipole arm the fourth additional radiating element each extend parallel to the longitudinal axis of the first column of radiating elements.

18. The base station antenna of claim 17, wherein the first and second additional radiating elements are vertically offset from the first column of radiating elements, and the third and fourth additional radiating elements are vertically offset from the second column of radiating elements.

* * * * *